(12) United States Patent
Domini et al.

(10) Patent No.: US 9,340,149 B2
(45) Date of Patent: May 17, 2016

(54) AUTOMOTIVE LIGHT

(75) Inventors: Chiara Domini, Udine (IT); Franco Marcori, Udinese (IT); Sara Paroni, Codroipo (IT)

(73) Assignee: Automotive Lighting Italia S.p.A., Venaria Reale (IT)

( * ) Notice: Subject to any disclaimer, the term of this patent is extended or adjusted under 35 U.S.C. 154(b) by 201 days.

(21) Appl. No.: 14/131,738

(22) PCT Filed: Jul. 11, 2012

(86) PCT No.: PCT/IB2012/053547
§ 371 (c)(1),
(2), (4) Date: May 16, 2014

(87) PCT Pub. No.: WO2013/008192
PCT Pub. Date: Jan. 17, 2013

(65) Prior Publication Data
US 2014/0293630 A1 Oct. 2, 2014

(30) Foreign Application Priority Data

Jul. 11, 2011 (IT) .............................. TV2011A0098

(51) Int. Cl.
*B60Q 1/30* (2006.01)
*F21V 8/00* (2006.01)
(Continued)

(52) U.S. Cl.
CPC ............... *B60Q 1/30* (2013.01); *B60Q 1/0052* (2013.01); *F21S 48/2237* (2013.01);
(Continued)

(58) Field of Classification Search
CPC . F21S 48/115; F21S 48/1241; F21S 48/2225; F21S 48/2231; F21S 48/2237; F21S 48/225; F21S 48/1195; B60Q 1/0011; G02B 6/001; G02B 6/0035; G02B 6/0036; G02B 6/0038
See application file for complete search history.

(56) References Cited

U.S. PATENT DOCUMENTS 5,984,497 A * 11/1999 Foerstner ............. B60Q 1/0011
362/511
6,107,916 A * 8/2000 Beck ..................... B60Q 1/0041
340/468

(Continued)

FOREIGN PATENT DOCUMENTS

DE 10239838 3/2004
EP 1898147 A1 3/2008
(Continued)

OTHER PUBLICATIONS

PCT International Search Report and Written Opinion dated Nov. 11, 2012; 10 pages.

*Primary Examiner* — Julie Bannan
(74) *Attorney, Agent, or Firm* — McCarter & English, LLP (57) ABSTRACT

An automotive light is provided that includes a light-guide bar made of photoconductive-material, which is at least partially positioned substantially grazing a corresponding transparent or semitransparent portion of the front lenticular half-shell of the light, and a second light source which is structured so as to emit light when electricity powered, and is arranged inside the rear body, close to one end of the light-guide bar, so as to direct the light produced inside the body of said light-guide bar. The light-guide bar is provided with a longitudinal light-extractor band which extends along the lateral side of the bar, and a multitude of deflector prisms which have an approximately triangle-shaped cross-section and are conveniently arranged along the longitudinal light-extractor band. One or more deflector prisms are shaped so that the active deflector surface has a bulging/arched profile substantially over the whole width of the longitudinal band.

14 Claims, 5 Drawing Sheets

(51) Int. Cl.
*B60Q 1/00* (2006.01)
*F21S 8/10* (2006.01)

(52) U.S. Cl.
CPC ........ *F21S 48/2268* (2013.01); *F21S 48/2287* (2013.01); *F21S 48/24* (2013.01); *G02B 6/001* (2013.01); *F21S 48/215* (2013.01); *G02B 6/0038* (2013.01)

(56) References Cited

U.S. PATENT DOCUMENTS

| | | | | |
|---|---|---|---|---|
| 6,641,295 | B1* | 11/2003 | Hu | B60Q 1/0052 362/540 |
| 7,460,751 | B2* | 12/2008 | Gomez Ruiz | F21S 48/2237 362/23.01 |
| 2003/0026106 | A1* | 2/2003 | Knaack | B60Q 1/0052 362/511 |
| 2008/0225548 | A1* | 9/2008 | Eichelberger | F21S 48/215 362/551 |
| 2010/0254152 | A1* | 10/2010 | Taleb-Bendiab | B60Q 1/0035 362/551 |
| 2011/0310630 | A1* | 12/2011 | Nakata | F21S 48/2268 362/511 |
| 2012/0218775 | A1* | 8/2012 | Nakada | F21S 48/215 362/602 |
| 2014/0211493 | A1* | 7/2014 | Ichikawa | F21S 48/2237 362/511 |
| 2014/0247616 | A1* | 9/2014 | Arrivet | B60Q 1/0052 362/511 |

FOREIGN PATENT DOCUMENTS

| | | |
|---|---|---|
| EP | 2098774 A1 | 9/2009 |
| EP | 2261083 A1 | 12/2010 |
| JP | 2006236588 | 9/2006 |

* cited by examiner

AUTOMOTIVE LIGHT

TECHNICAL FIELD

The present invention relates to an automotive light.

More s, the present invention relates to a rear light for cars, use to which the following description refers purely by way of example without this implying any loss of generality.

BACKGROUND ART

As is known rear lights of cars usually consist of a substantially basin-shaped, rigid rear body, which is structured so as to be stably recessed in a compartment specifically realized in the rear part of the vehicle body; of a front lenticular half-shell, which is at least partially made of transparent or semitransparent plastic material, usually possibly colored, and is arranged to close the mouth of the body so as to surface on the outside of the vehicle body; of one or more cup-shaped bodies with an approximately parabolic profile, each of which has a mirror-finished inner surface and is positioned within the rear body with its mouth facing a corresponding transparent or semitransparent portion of the front lenticular half-shell; and of a series of incandescent lamps, each of which is arranged close to the bottom of a respective cup-shaped body so as to backlight the portion of the front lenticular half-shell directly above the cup-shaped reflector body itself.

Furthermore, in some models of rear automobile lights, the front lenticular half-shell is provided with a narrow, elongated, i.e. ribbon-like, transparent or semitransparent portion, which usually surrounds at least one of the transparent or semitransparent portions of the front lenticular half-shell which are aligned with the mouths of the reflector cup-shaped bodies.

In order to uniformly backlight this ribbon-like portion of the front lenticular half-shell, some rear automotive light manufacturers have arranged a bar made of photoconductive material with an approximately circular section within the rear body, which bar seamlessly extends immediately underneath the inner surface of the front lenticular half-shell over the whole length of the same ribbon-like portion of the front lenticular half-shell; and a set of light emitting diodes, traditionally referred to as LEDs, which are positioned at both ends of the bar so as to direct the produced light directly into the body of the bar. The light then propagates into the photoconductive-material bar as a result of the same physical principles which govern the propagation of light within optical fiber cables.

Finally, the lateral side of the photoconductive-material bar which is opposite to the front lenticular half-shell is structured so as to direct some of the light which is propagated within the body of the bar towards the front lenticular half-shell so as to more or less uniformly backlight the entire ribbon-like portion of the front lenticular half-shell.

More in detail, the aforesaid lateral side of the photoconductive-material bar is provided with a flat longitudinal band which is locally substantially parallel to the surface of the front lenticular half-shell immediately above it, and with a multitude of rectilinear, triangular-section deflector prisms, which are appropriately distributed along said flat longitudinal band. These deflector prisms are additionally oriented perpendicularly to the centre line of the flat longitudinal band, and are arranged in sequence along the whole length of the flat longitudinal band of the bar, at a predetermined distance from one another.

While ensuring a significant cost saving as compared to a massive use of LEDs, the performance of the backlighting system by means of light-guide bars is not excellent when the photoconductive-material bar needs to be branched to take the light to two different sections of a same ribbon-like portion to be backlighted. Experimental tests have indeed indicated that the light extraction from the photoconductive-material bar body at the branches of the light-guide bar is not as uniform as in the rest of the bar body, and this very often produces/causes a locally irregular intensity distribution of the light crossing the ribbon-like portion of the front lenticular half-shell.

Regretfully, external observers perceives these "shadows" along the ribbon-like portion of the front lenticular half-shell as a fault of the rear light, and for this reason the major rear automotive light manufacturers have been forced to position LEDs at the distal end of each branch of the light-guide bar. Thereby, the light which is propagated within each branch of the guide-light bar comes from the LED(s) positioned at the distal end of the same branch and not from the branching from which the light-guide bar branch originates. This means that the light must not propagate within the light-guide bar branching in order to propagate within the light-guide branch.

In other words, each light-guide bar branch works in a substantially independent manner from one another. Obviously, this implies the use of a high number of LEDs, with resulting increase of costs.

DISCLOSURE OF INVENTION

Aim of the present invention is to solve the typical drawbacks of the backlighting system with light-guide bar.

In compliance with these aims, according to the present invention there is provided an automotive light as specified in claim 1 and preferably, though not necessarily in any one of the dependent claims.

BRIEF DESCRIPTION OF THE DRAWINGS

The present invention will now be described with reference to the accompanying drawings, which show a non-limitative embodiment thereof, in which:

FIG. 2 is a section view of the automotive light shown in FIG. 1, with parts removed for clarity; whereas

FIG. 6 is a section view of a segment of the light-guide bar shown in FIGS. 3, 4 and 5; whereas

BEST MODE FOR CARRYING OUT THE INVENTION

Figure 1:
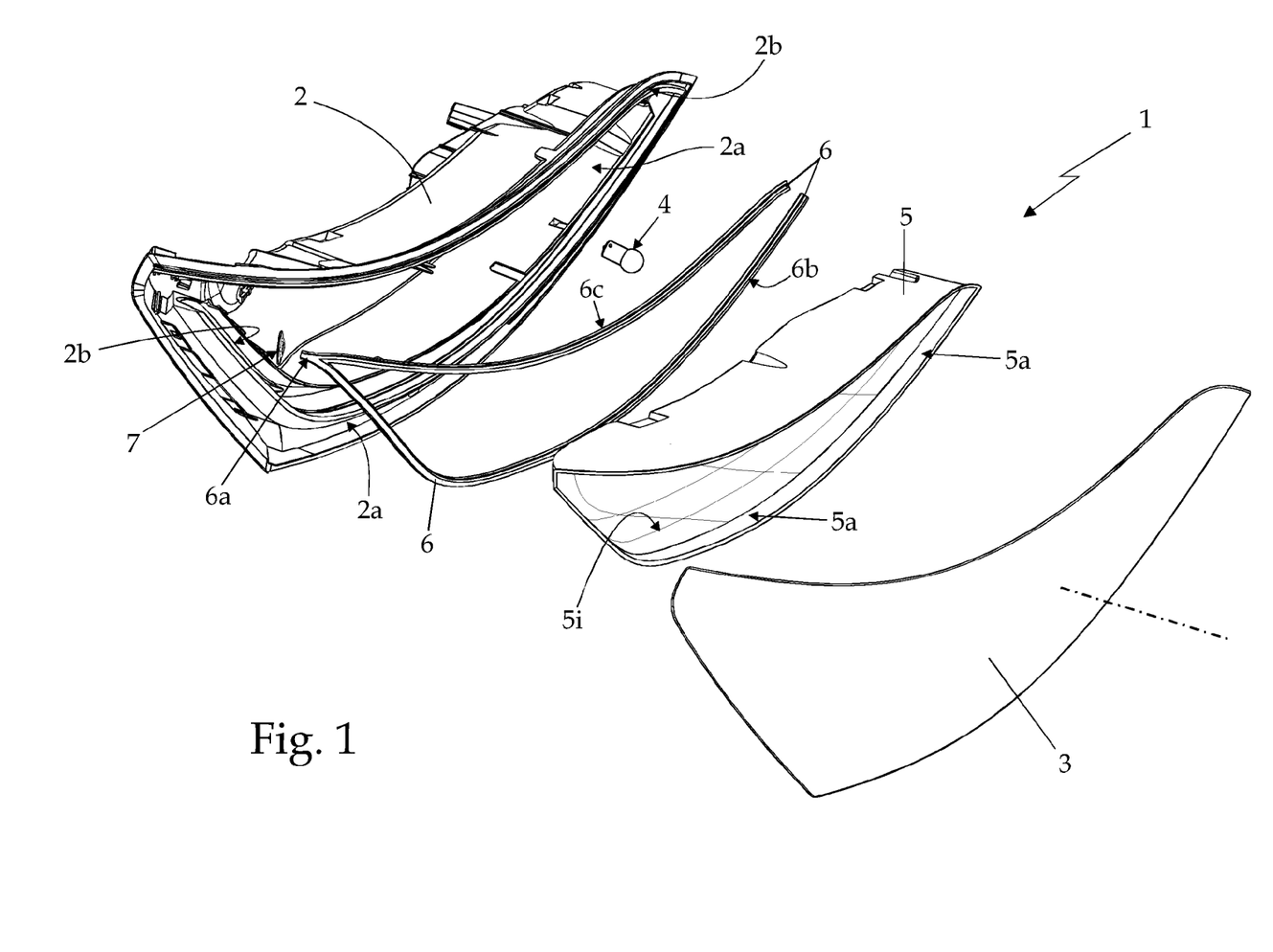
FIG. 1 shows an exploded axonometric view, with parts removed for clarity, of an automobile rear light realized according to the teachings of the present invention.
Figure 2:
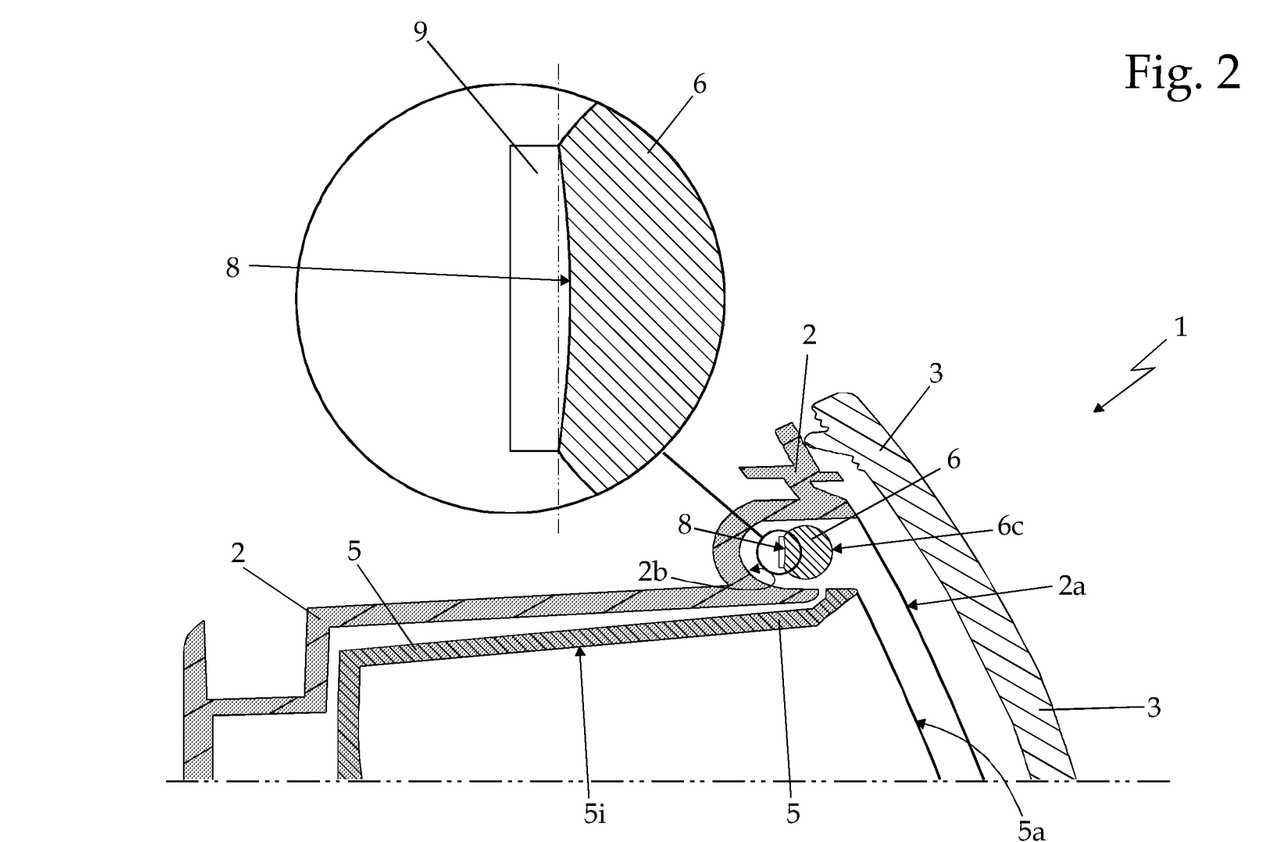

With reference to FIGS. 1 and 2, numeral 1 indicates as a whole an automotive light preferably particularly adapted to be fixed to the rear part of the body of a car, motorcycle or the like, i.e. a rear automotive light.

More in detail, in the example shown, the automotive light 1 is preferably, though not necessarily structured so as to be recessed in the rear part of a car, and comprises:

a substantially basin-shaped, rigid rear body 2, which is structured so as to be recessed into a compartment specifically made in the rear part of the vehicle body;

a front lenticular half-shell 3, which is provided with at least one portion made of transparent or semitransparent, possibly colored, material and is arranged to close the mouth 2a of the rear body 2, preferably, though not necessarily to surface on the outside of the vehicle body (not shown) at the same time; and at least one main light source 4, which is structured so as to emit light when electricity powered, and is arranged within the rear body 2 in a position to backlight a corresponding transparent or semitransparent portion of the front lenticular half-shell 3.

Obviously, in a different embodiment, the rear body 2 may be structured in order to be simply fixed so as to protrude from the rear part of the vehicle body.

Moreover, the automotive light 1 is preferably provided with at least one a light deflector body 5, which is placed inside the rear body 2 so as to surround the main light source 4, and is structured so as to divert, direct and/or reflect the light produced by said main light source 4 towards the transparent or semitransparent portion of the front lenticular half-shell 3 which is intended to be backlighted by the main light source 4.

In the example shown, in particular, the mouth 2a of the rear body 2 is preferably, though not necessarily substantially shaped as a triangle with curved sides; and the rear body 2 is preferably, though not necessarily made of an opaque plastic material by means of an injection molding process.

The front lenticular half-shell 3 instead has a bulging shape which is complementary with that of the mouth 2a of the rear body 2 so as to completely close/seal the rear body 2, and is preferably, though not necessarily entirely made of a transparent or semitransparent plastic material, preferably also with transparent or semitransparent portions of different colors, by means of an injection molding process.

In the example shown, in particular, the front lenticular half-shell 3 is made of transparent or semitransparent polycarbonate or polymethyl methacrylate.

On the other hand, with reference to FIGS. 1 and 2, the deflector body 5 preferably, though not necessarily consists of a cup-shaped body 5, which is recessed within the rear body 2 with the mouth 5a facing the lenticular half-shell 3 or rather a corresponding transparent or semitransparent portion of the lenticular half-shell 3, and the light source 4 is arranged close to the bottom of the cup-shaped body 5.

Preferably, though not necessarily, the inner surface 5i of the cup-shaped body 5 is additionally metallized or otherwise mirror-finished, so as to reflect the light produced by the light source 4 towards the transparent or semitransparent portion of the front lenticular half-shell 3 which is placed over the mouth 5a of the cup-shaped body 5.

Similarly to the rear body 2, the cup-shaped body 5 is also preferably made of an opaque plastic material by means of an injection molding process.

On the other hand, the main light source 4 preferably, though not necessarily consists of a traditional incandescent lamp 4 for automotive applications, which protrudes into the cup-shaped body 5 thus engaging a through opening specifically obtained for this purpose at the bottom of the cup-shaped body 5.

With reference to FIGS. 1 and 2, the automotive light 1 is additionally provided with at least one narrow, elongated, i.e. ribbon-like, and possibly also colored, light-guide profile 6 made of a photoconductive material, which extends into the rear body 2 immediately under a corresponding transparent or semitransparent portion of the lenticular half-shell 3; and with a LED light source 7 or the like, which is structured so as to emit light when electricity powered, and is arranged within the rear body 2, close to one end of the light-guide profile 6, so as to direct the light produced directly into the body of the light-guide profile 6. The light is then propagated within the light-guide profile 6 as a result of the same physical principles which govern the propagation of light within optical fiber cables.

The light-guide profile 6 is additionally structured so as to gradually direct the light which propagates within the body of the light-guide profile 6 towards the part of the lenticular half-shell 3 which is immediately above it, so as to backlight the entire ribbon-like, transparent or semitransparent portion of the lenticular half-shell 3.

In, particular, in the example shown, the light-guide profile 6 is preferably arranged/recessed in a groove or elongated slot 2b, which is specifically made within the rear body 2, immediately under the ribbon-like portion of the lenticular half-shell 3 to be backlighted.

Figure 3:
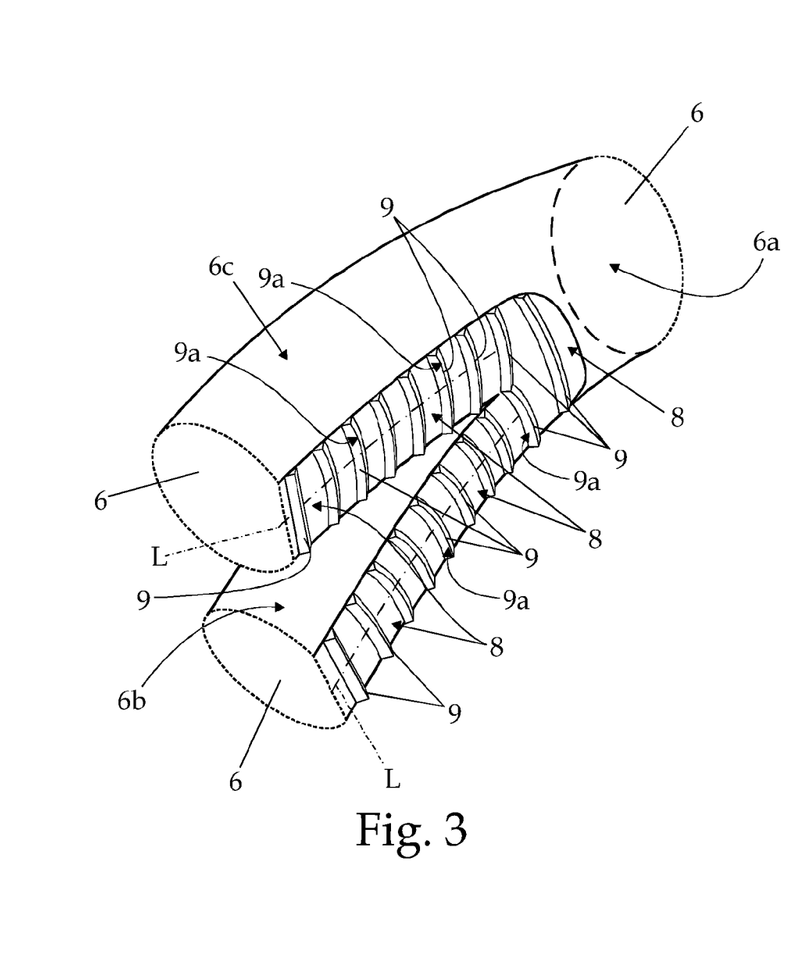
FIGS. 3, 4 and 5 show details of the light-guide bar used in the automotive light in FIG. 1 on enlarged scale.
Figure 4:
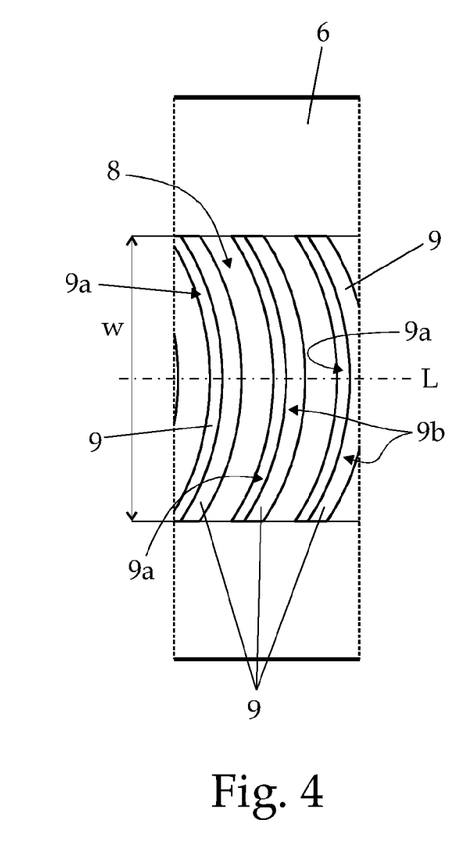

With reference to FIGS. 1, 2 and 3, in particular, the light-guide profile 6 of the automotive light 1 consists of a bar 6 made of a photoconductive material with substantially circular or elliptical cross-section which, at the end of an initial segment 6a (i.e. in a predetermined point of its length), divides/branches into at least two branches 6b and 6c, each of which substantially grazes a corresponding segment/section of the transparent or semitransparent ribbon-like portion of the lenticular half-shell 3 to be backlighted, and again preferably has a substantially circular or elliptical cross-section.

The light source 7 is instead arranged at the proximal end of the photoconductive-material bar 6, i.e. upstream of the branching which forms the two branches 6b and 6c of the bar, so as to direct the produced light directly into the initial segment 6a of the photoconductive-material bar 6. The light then propagates within the photoconductive-material bar 6, also concerning the branches 6b and 6c of the bar, as a result of the same physical principles which govern the propagation of light within optical fiber cables.

In other words, the light source 7 is positioned facing the free end of the initial segment 6a of the photoconductive-material bar 6, and is oriented so as to direct the light produced within the initial segment 6a of the photoconductive-material bar 6 itself. The light is then propagated within the photoconductive-material bar 6 rebounding within, the body of the bar 6 as a result of the same physical principles which govern the propagation of light within optical fiber cables.

In the example shown, in particular, the light-guide bar 6 is preferably, though not necessarily made of Plexiglas, transparent polycarbonate or other similar plastic material, preferably by means of an injection molding process. Furthermore, the shape of the cross-section of the bar branch 6b is preferably, though not necessarily substantially equal to the shape of the cross-section of the branch 6c of the same bar, and possibly also substantially equal to the cross-section of the initial segment 6a of the photoconductive-material bar 6.

With reference to FIGS. 2, 3, 4 and 5, on the side opposite to the lenticular half-shell 3, the light-guide bar 6 is, further provided with a longitudinal, substantially flat light-extractor band 8, which starts from the lateral side of the initial segment 6a of the light-guide bar 6, upstream of the branching, and then continues on the lateral side of both branches 6b and 6c of the light-guide bar 6, preferably substantially over the whole length of the branches 6b and 6c of the bar; and with a multitude of deflector prisms 9 with an approximately triangular cross-section, which are appropriately distributed along the entire longitudinal band 8, and are profiled so as to divert the light rays r which penetrate within the deflector prism 9 towards the outside of the light-guide bar 6, on the side opposite to the longitudinal band 8, i.e. towards the front lenticular half-shell 3.

More in detail, each deflector prism 9 is positioned on the longitudinal band 8 so as to be locally substantially perpendicular to the centre line L of the longitudinal band 8, and is provided with two lateral surfaces 9a and 9b oriented so as to be locally substantially orthogonal to the centre line L of the longitudinal band 8. The lateral surface 9a which is intended to be hit/struck by the light rays r propagated within the photoconductive-material bar 6 from the light source 7, is usually referred to as active deflector surface 9a of the prism, and is profiled/shaped so as to divert the incident light rays r towards the outside of the light-guide bar 6, substantially on the opposite side with respect to the longitudinal band 8, towards the lenticular half-shell 3.

In other words, the active deflector surface 9a of the deflector prism 9 is oriented so as to be locally transversal to the centre line L of the longitudinal light-extractor band 8.

Additionally, in the example shown, the longitudinal light-extractor band 8 is preferably oriented so as to be locally substantially parallel to the surface of the lenticular half-shell 3 immediately above it.

Unlike the currently known automotive lights, the deflector prisms 9 which are arranged at and/or immediately downstream of the branching of the light-guide bar 6, are shaped so that the active deflector surface 9a of the deflector prism 9 has a bulging/arched profile over the whole width w of the longitudinal light-extractor band 8.

On the other hand, the deflector prisms 9 which are arranged away from the branching of the light-guide bar are preferably, though not necessarily rectilinear prisms with a substantially triangular section in which the active deflector surface 9a is maintained substantially flat over the whole width w of the longitudinal band 8.

Figure 5:
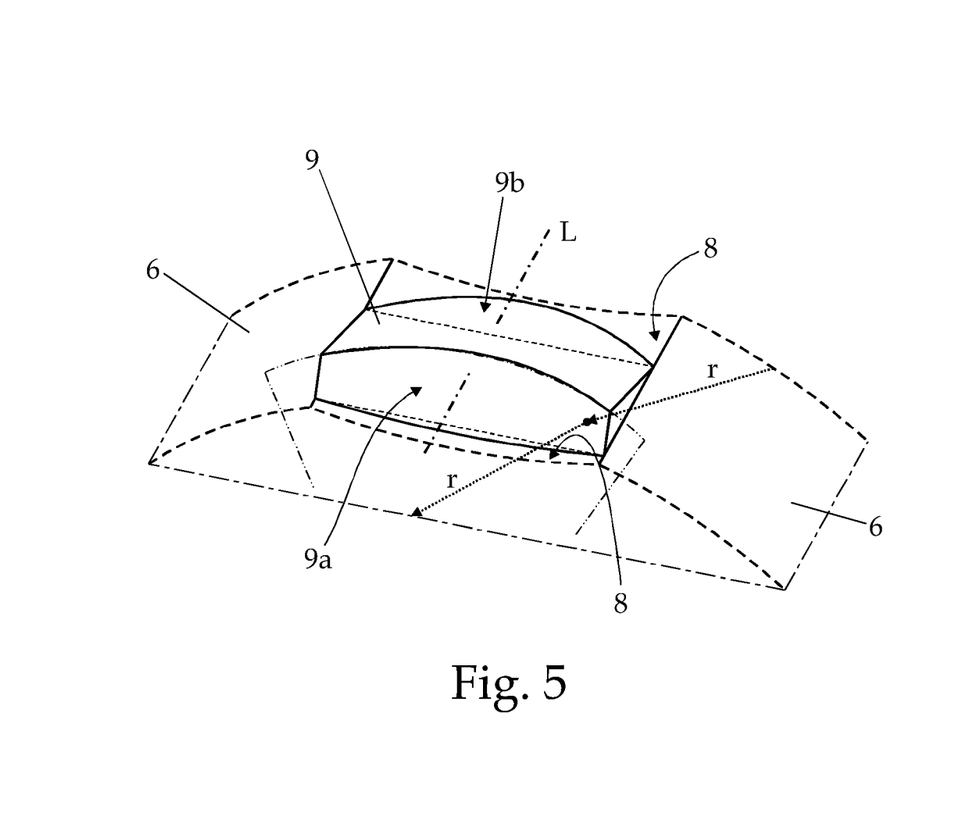
Figure 6:
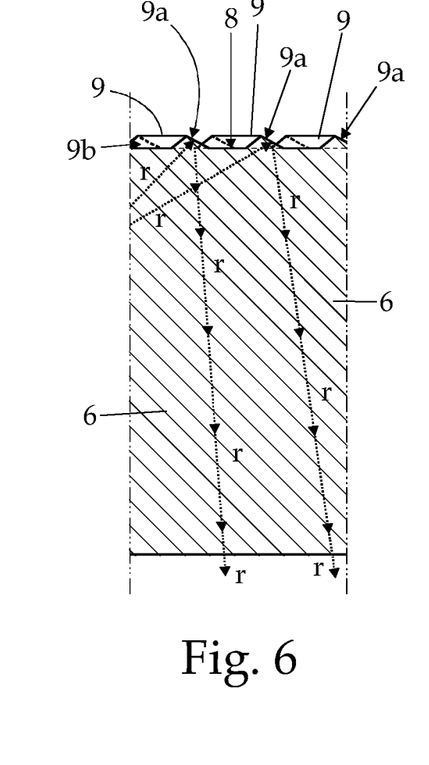

With reference to FIGS. 3, 5 and 6, in the example shown, in particular, the deflector prisms which are arranged at and/or immediately downstream of the branching of the light-guide bar 6, are preferably shaped so that the active deflector surface 9a has a concave profile, i.e. has the concavity facing outwards from the deflector prism 9, and a substantially truncated-cone shape converging towards the centre of the light-guide bar 6. The symmetry axis of the truncated-cone-shaped surface is instead locally substantially orthogonal to the centre line L of the longitudinal band 8.

In the example shown, instead, the second lateral surface 9b of the deflector prism 9 preferably, though not necessarily has a convex profile (i.e. has the concavity facing the interior of the deflector prism 9), and a substantially truncated-cone shape diverging towards the active, deflector surface 9a, with the symmetry axis of the truncated-cone-shaped surface arranged locally substantially parallel to the centre line L of the longitudinal band 8.

In other words, the second lateral surface 9b of the deflector prism 9 is also preferably shaped so as to have a bulging/arched surface substantially over the whole width w of the longitudinal light-extractor band 8.

However, in a different embodiment, the second lateral surface 9b of the deflector prism 9 could also be substantially flat over the whole width w of the longitudinal light-extractor band 8.

Furthermore, with reference to FIGS. 2 and 5, in the example shown, the portion of the outer surface of the light-guiding bar 6 which forms the longitudinal light-extractor band 8 preferably, though not necessarily has a slightly curved/arched profile towards the centre of the bar 6 so as to form a longitudinal hollow locally substantially cylinder-sector shaped, with the symmetry axis of the cylindrical surface arranged locally parallel to the centre line L of the longitudinal band 8.

Also in this case, in a different embodiment, the portion of the outer surface of the light-guiding bar 6 which forms the longitudinal light-extractor band 8 could also be substantially flat over the whole width w of the longitudinal light extractor band 8.

The general operation of the automotive light 1 is easily inferable from the above description and no further explanations are required.

On the other hand, with regards to the deflector prisms 9 which are arranged at and/or immediately downstream of the branching of the light-guide bar 6, experimental tests have indicated that the bulging/arched shape of the active deflector surface 9a of the deflector prisms 9 allows to obtain a much more uniform distribution of the light exiting from the light guide bar 6 at the branching.

This better distribution of the light at the branching on the light-guide bar 6 avoids the formation of "shadows" along the ribbon-like portion of the front lenticular half-shell a, and allows to not arrange additional light sources at the distal ends of the branches 6b and 6c of the photoconductive-material bar 6.

In other words, the particular structure of the photoconductive-material bar 6 allows to uniformly backlight the entire ribbon-like portion of the front lenticular half-shell 3, using only the light source 7 positioned at the free end of the initial segment 6a of the photoconductive-material bar 6.

The advantages deriving from the particular structure of the automotive light 1 are apparent. The bulging/arched shape of the active deflector surface 9a of the deflector prisms 9 which are arranged at and/or immediately downstream of the branching of the light-guide bar 6, allows to use only one LED light source 7 or the like, arranged within the rear body 2 at the initial segment 6a of the light-guide bar 6, thus allowing to significantly reduce the overall production costs of this type of rear automotive lights.

It is finally apparent that changes and variations can be made to the automotive light 1 described herein without departing from the scope of the present invention.

For example, in another embodiment, the deflector prisms 9 which are positioned on the longitudinal band 8 may also have a substantially trapezoidal-shaped cross-section.

Figure 7:
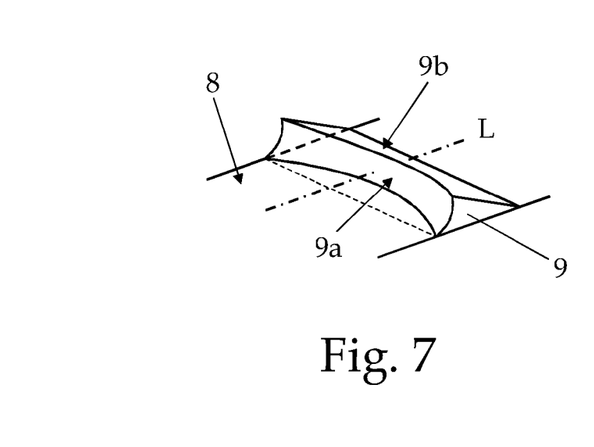
FIGS. 7, 8, 9 and 10 show a perspective view on enlarged scale of an equal number of alternative embodiments of the deflector prisms on the light-guide bar of the automotive light in FIG. 1.

With reference to the embodiment shown in FIG. 7, the active deflector surface 9a of the deflector prisms 9 which are arranged at and/or immediately downstream of the light-guide bar 6, may have a concave, substantially toroid-shaped profile, in which the reference axis of the torus is preferably arranged locally and substantially parallel to the laying plane of the longitudinal light-extractor band 8. The second lateral surface 9b of the deflector prism 9 is maintained instead substantially flat over the whole width w of the longitudinal band 8.

Figure 8:
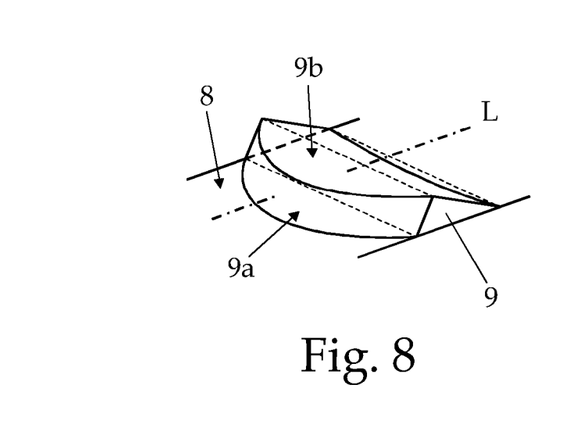

With reference to the embodiment shown in FIG. 8, the active deflector surface 9a of the deflector prisms 9 arranged at and/or immediately downstream of the light-guide bar 6 may have instead a convex, substantially truncated-cone-shaped profile, diverging towards the centre of the photoconductive-material bar 6, in which the symmetry axis of the cone is preferably arranged locally and substantially perpendicular to the laying plane of the longitudinal light-extractor band 8. The second lateral surface 9b of the deflector prism 9 has instead a concave, substantially truncated-cone-shaped profile diverging towards the active deflector surface 9a, and with the symmetry axis of the truncated-cone-shaped surface arranged locally substantially parallel to the centre line L of the longitudinal band 8.

Figure 9:
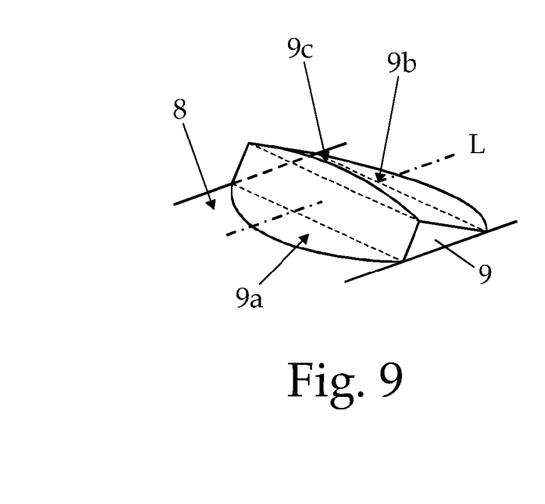

With reference to the embodiment shown in FIG. 9, the active deflector surface 9a of the deflector prisms 9 arranged at and/or immediately downstream of the branching of the light-guide bar 6 may have a convex, substantially truncated-cone-shaped profile, diverging towards the centre of the photoconductive-material bar 6, in which the symmetry axis of the cone is preferably arranged locally and substantially perpendicular to the laying plane of the longitudinal light-extractor band 8. Similarly, the second lateral side surface 9b of the deflector prism 9 has a convex, substantially truncated-cone-shaped profile diverging towards the centre of the photoconductive-material bar 6, in which the symmetry axis of the cone is preferably arranged locally perpendicular to the laying plane of the longitudinal light-extractor band 8.

In this embodiment, the upper edge 9c of the deflector prism 9 is arched upwards.

Figure 10:
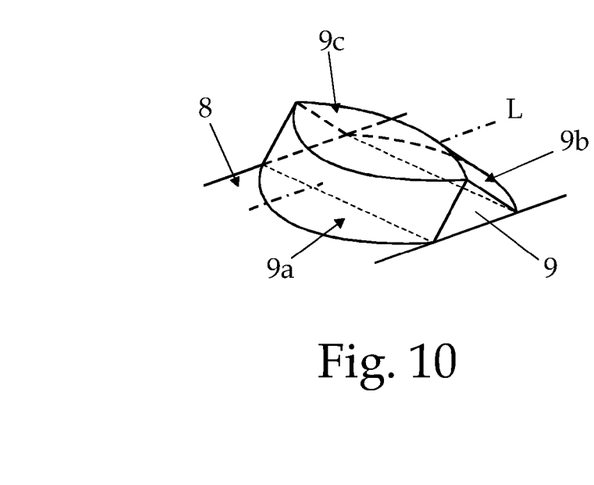

Finally, with reference to the embodiment in FIG. 10, the active deflector surface 9a of the deflector prism 9 arranged at and/or immediately downstream of the branching of the light-guide bar 6, may have a convex, substantially truncated-cone-shaped profile diverging towards the centre of the photoconductive-material bar 6, in which the symmetry axis of the cone is preferably arranged substantially perpendicular to the laying plane of the longitudinal light-extractor band 8; while the second lateral surface 9b of the deflector prism 9 has a convex, substantially truncated-cone shaped profile diverging towards the centre of the photoconductive-material bar 6, in which the symmetry axis of the cone is preferably arranged locally substantially perpendicular to the laying plane of the longitudinal light-extractor beam 8.

Furthermore, a flat transversal chamfer, which extends locally substantially parallel to the longitudinal band 8 underneath, is provided at the upper edge 9c of the deflector prism 9.

Moreover, in a further embodiment (not shown), the active deflector surface 9a of the deflector prism 9 may have a concave part and a convex part.

The invention claimed is:

1. Automotive light (1) comprising a substantially basin-shaped, rear body (2) that defines a mouth (2a) which is structured so as to be fixed onto the vehicle body; a front lenticular half-shell (3) which is provided with at least one portion in transparent or semitransparent material and is arranged to close the mouth (2a) of the rear body (2); and at least a first light source (5) which is structured so to emit light when electricity powered, and is arranged within the rear body (2) in a position so as to be able to backlight a corresponding transparent or semitransparent portion of the front lenticular half-shell (3);

the automotive light (1) further comprising a photoconductive-material light-guide bar (6) which is placed inside the rear body (2), and a second light source (7) which is structured so to emit light when electricity powered, and is arranged inside the rear body (2), close to one end of the light-guide bar (6), so as to direct the light produced inside the body of said light-guide bar (6);

the light-guide bar (6) being equipped with a longitudinal light-extractor band (8) which extends along the lateral side of the bar, and a plurality of deflector prisms (9) which have a substantially triangular- or trapezoidal-shaped cross-section and are arranged along said longitudinal light-extractor band (8); each deflector prism (9) being arranged on the longitudinal band (8) so to be locally transversal to the center line (L) of the longitudinal band (8) and being provided with an active deflector surface (9a) which is designed to be hit by the light rays (r) coming from the second light source (7) and propagating inside the light-guide bar (6), and which is oriented so as to locally deviate the incident light rays (r) towards the outside of the light-guide bar (6), substantially on the opposite side to the longitudinal light-extractor band (8);

the automotive light (1) being characterized in that at least one of said deflector prisms (9) is shaped so that its active deflector surface (9a) has a bulging/arched profile.

2. Automotive light according to claim 1, characterized in that said photoconductive-material light-guide bar (6), at the end of a starting segment (6a), divides/branches off into at least two branches (6b, 6c) each substantially grazing said transparent or semitransparent portion of the front lenticular half-shell (3); the second light source (7) being placed close to the starting segment (6a) of the light-guide bar (6) so as to direct the light produced directly inside said starting segment (6a); the longitudinal light-extractor band (8) extending along the side of the starting segment (6a) of the light-guide bar (6) and along the side of both branches (6b, 6c) of the same light-guide bar (6), and the deflector prisms (9) that are placed near to and/or immediately downstream of the branching of the light-guide bar (6), being shaped so that the active deflector surface (9a) of each deflector prism (9) has a bulging/arched profile.

3. Automotive light according to claim 1, characterized in that the active deflector surface (9a) of said deflector prism (9) is shaped to have a bulging/arched profile substantially for the whole width (w) of the longitudinal light-extractor band (8).

4. Automotive light according to claim 1, characterized in that said photoconductive-material light-guide bar (6) has a substantially circular or elliptical cross section.

5. Automotive light according to claim 1, characterized in that the longitudinal light-extractor band (8) is located on the opposite side of the light-guide bar (6) with respect to the front lenticular half-shell (3).

6. Automotive light according to claim 1, characterized in that the portion of the outer surface Of the light-guide bar (6) that forms the longitudinal light-extractor band (8), has a curved/arched profile so as to form a hollow with a substantially cylindrical-sector shape.

7. Automotive light according to claim 1, characterized in that the deflector prism (9) is provided with a second lateral surface (9b) locally substantially orthogonal to the centre line (L) of the longitudinal band (8), and in that said second lateral surface (9b) of the prism is shaped to have a substantially bulging/arched profile for the whole width (w) of the longitudinal light-extractor band (8).

8. Automotive light according to claim 1, characterized in that the longitudinal light-extractor band (8) extends on the lateral side of the branch (6b, 6c) of the light-guide bar (6) substantially for the entire length of the branch (6b, 6c).

9. Automotive light according to claim 1, characterized in that said photoconductive-material light-guide bar (6) is made of plastic material via an injection molding process.

10. Automotive light according to claim 1, characterized in that the second light source (7) is a LED light source.

11. Automotive light according to claim 1, characterized in that the light-guide bar (6) is arranged inside a groove or slot (2b) specifically realized inside the rear body (2), immediately beneath the transparent or semitransparent portion of the front lenticular half-shell (3) to be backlighted.

12. Automotive light according to claim 1, characterized by also comprising a light deflector body (5) which is arranged inside the rear body (2) so as to surround the first light source (4), and is structured so as to be able to deviate, direct and/or reflect the light produced by said first light source (4) towards the corresponding transparent or semitransparent portion of the front lenticular half-shell (3).

13. Automotive light according to claim 12, characterized in that the light deflector body (5) is a cup-shaped body (5) which is arranged inside the rear body (2) with the mouth (5a) facing a corresponding transparent or semitransparent portion of the front lenticular half-shell (3), and said first light source (4) is arranged close to the bottom of the cup-shaped body (5).

14. Automotive light according to claim 1, characterized in that the active deflector surface (9a) of said deflector prism (9) has a concave part and a convex part.

* * * * *